United States Patent [19]
Shin et al.

[11] Patent Number: 6,017,619
[45] Date of Patent: Jan. 25, 2000

[54] NI/PT MULTILAYERS FOR MAGNETO-OPTICAL RECORDING MEDIA

[75] Inventors: Sung-chul Shin; G. Srinivas, both of Daejeon-shi, Rep. of Korea

[73] Assignee: Korea Advanced Institute of Science and Technology, Daejeon, Rep. of Korea

[21] Appl. No.: 08/937,969

[22] Filed: Sep. 25, 1997

[30] Foreign Application Priority Data

Jan. 6, 1997 [KR] Rep. of Korea ............................ 97-134

[51] Int. Cl.$^7$ ....................................................... G11B 5/66
[52] U.S. Cl. ................. 428/332; 428/336; 428/694 ML; 428/694 MT; 428/694 MM; 428/694 IS; 428/694 T; 428/694 TM; 428/900; 204/192.2; 427/128; 427/129; 427/130
[58] Field of Search ..................................... 478/336, 332, 478/694 ML, 694 MT, 694 MM, 694 IS, 694 T, 694 TM, 900; 204/192.2; 427/128–130

[56] References Cited

U.S. PATENT DOCUMENTS

| | | | |
|---|---|---|---|
| 4,587,176 | 5/1986 | Carcia | 428/611 |
| 4,992,336 | 2/1991 | Yamamoto | 428/635 |
| 5,112,701 | 5/1992 | Katsuragawa | 428/694 NF |
| 5,361,248 | 11/1994 | Hatwar et al. | 369/275.2 |

*Primary Examiner*—Leszek Kiliman
*Attorney, Agent, or Firm*—Dilworth & Barrese

[57] ABSTRACT

This invention relates to magneto-optical recording media with thin films of Ni/Pt multilayers. Ni/Pt multilayer films, prepared by sequential dc magnetron sputter deposition by a suitable choice of the sublayer thicknesses and the number of repeats of the multilayer, exhibit most of the desired properties such as perpendicular magnetic anisotropy, high coercivity, low Curie point, and substantial Kerr rotation which are essential for magneto-optical recording media.

12 Claims, 5 Drawing Sheets

NI/PT MULTILAYERS FOR MAGNETO-OPTICAL RECORDING MEDIA

FIELD OF THE INVENTION

The present invention relates to the choice of sublayer thicknesses and the number of repeats in Ni/Pt multilayers essential to obtain perpendicular magnetic anisotropy at and above room temperature and novel properties suitable for magneto-optical recording media.

BACKGROUND OF THE INVENTION

In magneto-optical recording, digital data in the form of magnetic domains are written on a magnetic thin film having perpendicular magnetic anisotropy by a laser beam which raises the temperature of the focussed area of the film up to the Curie temperature under an applied external magnetic field of about 300 Oe. This information is read by irradiating the medium with a linearly polarized beam and detecting the change of polarization of the incident beam caused by the interaction with the magnetization.

The currently used recording media are made of thin films of rare earth-transition metal alloys. The widely accepted choice today is an alloy of TbFeCo. Though these alloy thin films are widely used today, they face limitations of (a) low Kerr rotation at blue wavelengths and hence are unsuitable for future high-density storage (b) low shelf life time due to their easy oxidation.

The multilayers of ferromagnetic metal and noble metal are being explored today as ideal alternatives for high-density storage media. These multilayers for application to magneto-optical storage media are expected to satisfy certain requirements such as (a) perpendicular magnetic anisotropy(PMA) (b) large Kerr rotation, especially at lower wavelengths, (c) large room temperature coercivity,(d) low Curie temperature in the range 150–250° C. and (e) corrosion-resistance.

Multilayers of Co/Pt and Co/Pd with novel properties of large perpendicular magnetic anisotropy and relatively high Kerr rotation at short wavelengths are being considered as ideal choices for new high density magneto-optical recording media. Co/Pt or Co/Pd multilayers with cobalt thickness, $t_{Co}$, of about 3 or 4 Å have been found to satisfy most of the desired magnetic and magneto-optical properties.

However, lower Curie temperatures not only reduce the power of lasers required for writing but also decide the write/erase cyclability. And yet, the Curie temperatures of these multilayers, Co/Pt and Co/Pd are relatively higher by about 100–200° C. than the writing temperature achievable practically for these applications today.

Alloying cobalt layer with nickel in Co/Pt multilayers has been found to a good alternative to reduce Curie temperature. However, alloying cobalt layer faces limitations of associated changes in saturation magnetization, Kerr rotation, changes in interfacial structure, and decrease in anisotropy energy etc.

Though there are published reports of observation of perpendicular magnetic anisotropy in Ni/Pt (Krishnan et.al., Appl.Phys.Lett. 59 (1991), pp.3649–3650), all of these reports indicate observation of this essential feature at temperatures far below room temperature, about 5 K, which make them unsuitable for application to magneto-optical recording media.

SUMMARY OF THE INVENTION

The present invention provides alternate magneto-optical recording media with novel and desired properties that could be prepared by a suitable choice of sublayer thickness and number of repeats of the multilayer.

The property of perpendicular anisotropy at and above room temperature besides hysterisis loops with loop rectangularity of unity is observed for multilayers with thickness of nickel above 9 Å and less than 21 Å and the thickness of platinum sublayer less than 4 Å.

The number of repeats for obtaining this vital property are in the range of 20–35 for multilayers with the thickness of nickel sublayer less than or equal to 11 Å and in the range of 10–20 for multilayers with the thickness of nickel sublayer greater than or equal to 12 Å.

DETAILED DESCRIPTION OF THE INVENTION

Figure 1:
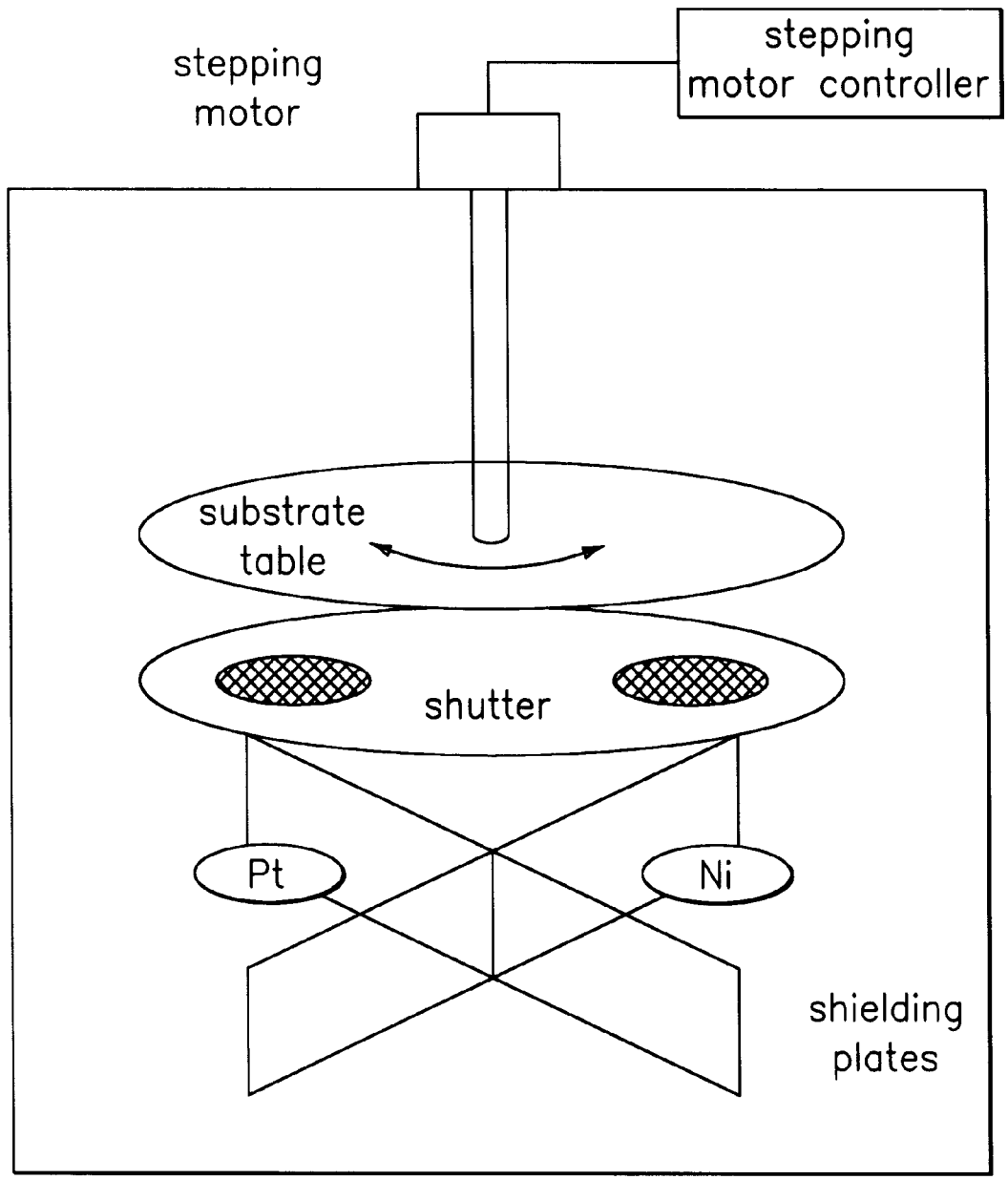
FIG. 1 is a schematic diagram of the sputtering system used to deposit Ni/Pt multilayers.

FIG. 1 illustrates the schematic of the sputtering system employed in the present invention for depositing Ni/Pt multilayers. Ni/Pt multilayers were deposited on glass substrates by sequential dc magnetron sputtering of Ni and Pt at an Ar sputtering pressure of 7 mTorr and applied power of 30 W to each of the targets. The substrates of this invention is also PMMA(polymethyl methacrylate), PC(polycarbonate) or silicon etc.

The distance between the sputtering source and the substrate was about 7.5 cm. The deposition rates achieved under these conditions were 1 Å/sec for Ni and 3.25 Å/sec for Pt. The thickness of nickel sublayer, $t_{Ni}$ was varied from 3 Å to 21 Å and that of platinum, $t_{Pt}$, was varied from 2 Å to 8 Å.

Figure 2:
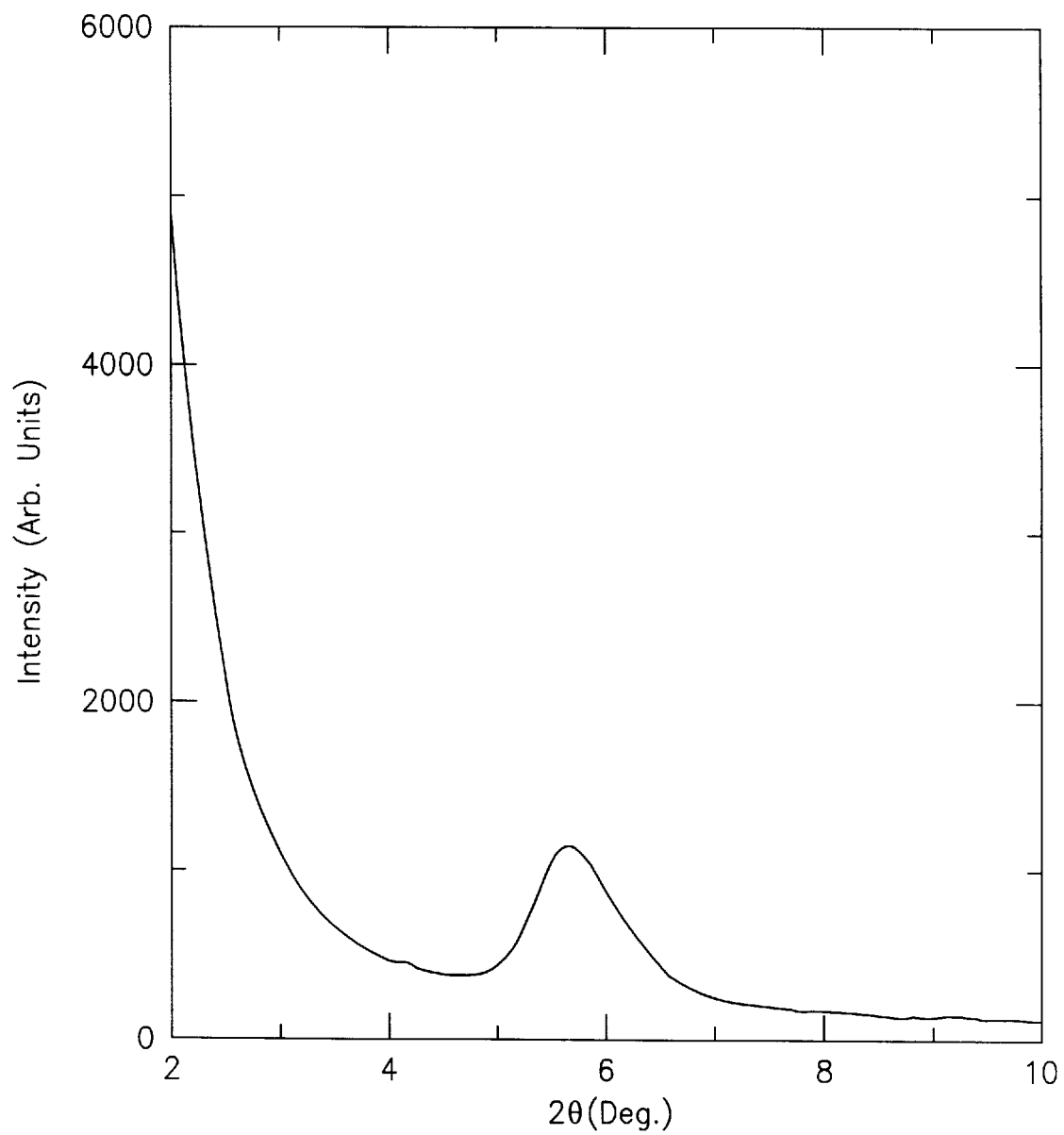
FIG. 2 shows a typical low angle X-ray diffraction pattern of the Ni/Pt multilayer corresponding to (11-Å Ni/3.5-Å Pt)$_{30}$.

FIG. 2 illustrates a typical low angle x-ray diffraction (XRD) pattern of the Ni/Pt multilayer corresponding to (11-Å Ni/3.5-Å Pt)$_{30}$. The low-angle XRD pattern of Ni/Pt multilayer showed peaks characteristic of the multilayer structure with smooth interfaces. In sputter deposition the energetic bombardment of reflected Ar neutrals reduces fcc texture and thereby anisotropy. Lower input power applied to platinum target is expected to improve the fcc orientation of multilayer and the lower process pressure is expected to develop smooth surfaces. Therefore, film prepared under these deposition conditions (of low applied target power) is expected to have higher anisotropy.

We have observed the Kerr loops with loop squareness of unity for multilayers with (a) $t_{Ni}$=9 to 11 Å and $t_{Pt}$=2 to 4 Å and the number of repeats of 30, and (b) $t_{Ni}$=12 to 21 Å and $t_{Pt}$=2 to 4 Å and the number of repeats of 15. We have observed that decreasing the number of repeats for multilayers with $t_{Ni}$≦11 Å or increasing the number of repeats for multilayers with $t_{Ni}$≧12 Å resulted in a decrease of loop squareness ratio, indicating that choice of sublayer thicknesses and the number of repeats are very critical in observing PMA at room temperature. The minimum thickness of Ni sublayer for which the Kerr loops could be observed was 9 Å.

Figure 3:
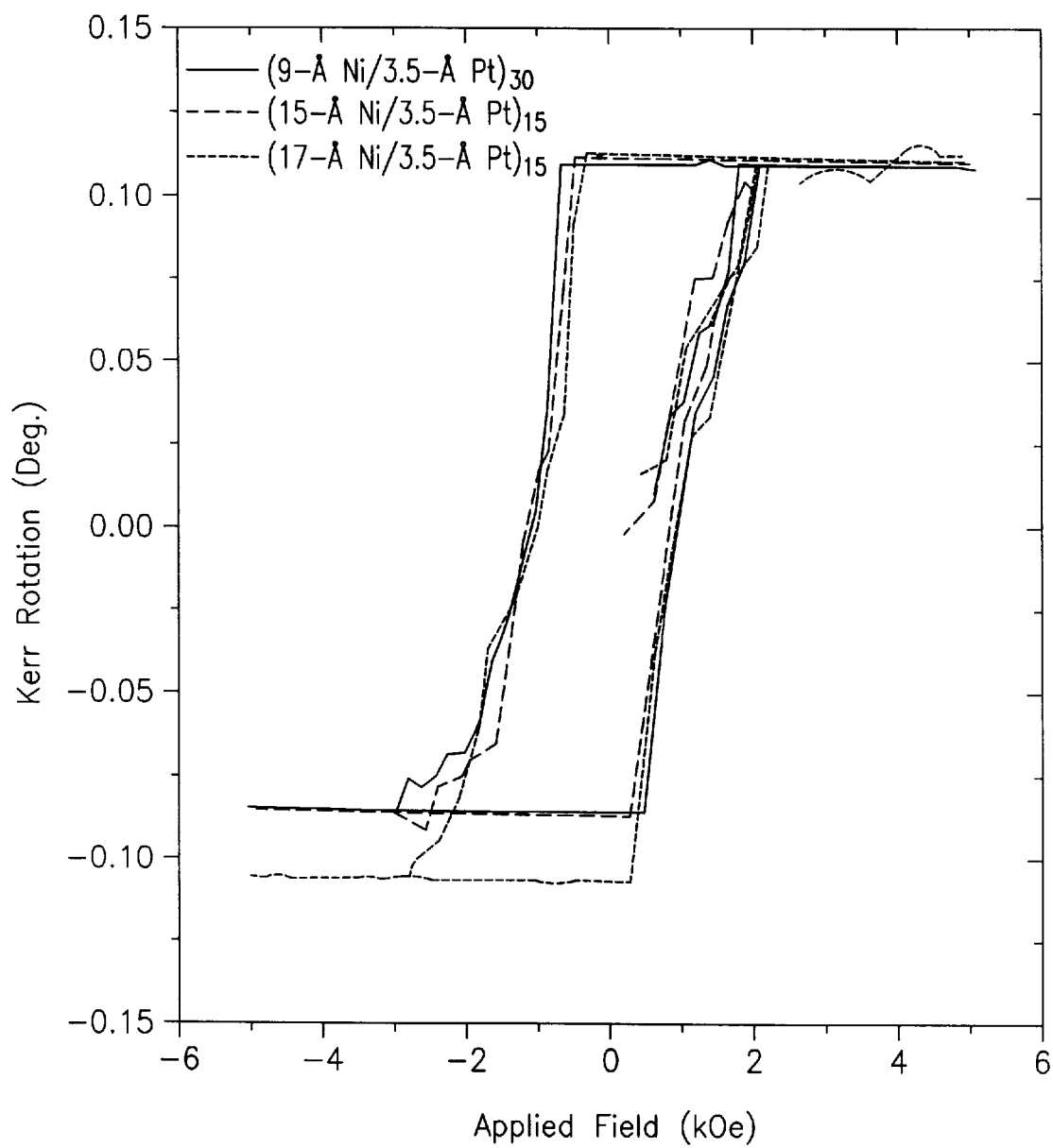
FIG. 3 shows typical polar Kerr loops of Ni/Pt multilayers corresponding to (a) (9-Å Ni/3.5-Å Pt)$_{30}$, (15-Å Ni/3.5-Å Pt)$_{15}$, and (17-Å Ni/3.5-Å Pt)$_{15}$.

FIG. 3 illustrates the typical polar Kerr loops of Ni/Pt multilayers corresponding to (9-Å Ni/3.5-Å Pt)$_{30}$, (15-Å Ni/3.5-Å Pt)$_{15}$, and (17-Å Ni/3.5-Å Pt)$_{15}$. Table 1 summarizes the results of coercivity which is typically about 1 kOe, loop squareness ratio, and saturation magnetization for several multilayers exhibiting the loop squareness of unity.

TABLE 1

| Sample | Coercivity (Oe) | Loop squareness ratio | Saturation magnetization, Ms(e.m.u/cc) |
| --- | --- | --- | --- |
| (9-Å Ni/3.5-Å Pt)$_{30}$ | 1071 | 1 | 228 |
| (11-Å Ni/3.5 Å Pt)$_{30}$ | 1142 | 1 | 246.6 |
| (13-Å Ni/3.5-Å Pt)$_{15}$ | 876 | 1 | 242.7 |
| (15-Å Ni/3.5-Å Pt)$_{15}$ | 846 | 1 | 277.5 |
| (17-Å Ni/3.5-Å Pt)$_{15}$ | 900 | 1 | 315.9 |
| (19-Å Ni/3.5-Å Pt)$_{15}$ | 1029 | 1 | 355 |

It can be observed from Table 1, th at the coercivity and magnetization are increased with increasing the nickel sublayer thickness. An increase in the coercivity with increasing the nickel sublayer thickness can be ascribed to the increased anisotropy energy resulting probably from the improved fcc texture of Ni layers. Higher coercivity values and higher loop squareness ratios were observed when the thickness of platinum sublayer was about 3 Å. As the coercivity shows a direct dependence on the anisotropy energy and an inverse dependence on the saturation magnetization, our VSM(Vibrating Sample Magnetometer) observation indicates increase in the magnetization with increasing the Ni sublayer thickness.

Figure 4:
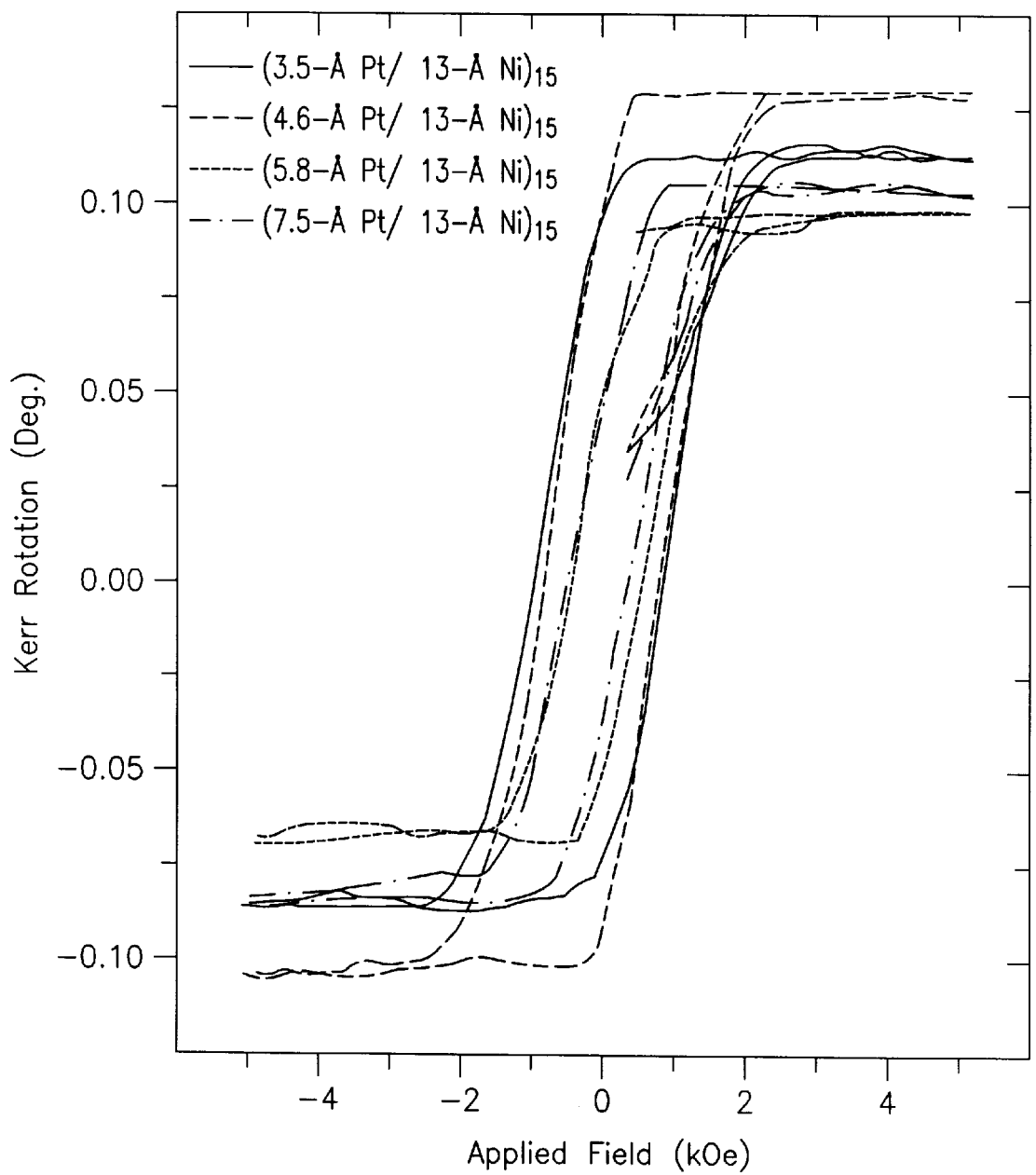
FIG. 4 shows typical polar Kerr loops of Ni/Pt multilayers in a case of changing $t_{Pt}$ with fixing 13-Å $t_{Ni}$ and the number of repeats of 15.

FIG. 4 illustrates the typical polar Kerr loops of Ni/Pt multilayers in a case of changing $t_{Pt}$ in fixing 13-Å $t_{Ni}$ and the number of repeats of 15. Table 2 summarizes the results of coercivity and loop squareness ratio of Ni/Pt multilayers in a case of changing $t_{Pt}$ with fixing 13-Å $t_{Ni}$ and the number of repeats of 15.

TABLE 2

| Sample | Coercivity (Oe) | Loop Squareness ratio |
| --- | --- | --- |
| (3.5-Å Pt/13-Å Ni)$_{15}$ | 876 | 1 |
| (4.6-Å Pt/13-Å Ni)$_{15}$ | 779 | 0.9 |
| (5.8-Å Pt/13-Å Ni)$_{15}$ | 500 | 0.6 |
| (7.5-Å Pt/13-Å Ni)$_{15}$ | 386 | 0.58 |

In general the loop squareness was decreased with increasing the nickel sublayer thickness for the same $t_{Ni}$ platinum sublayer thickness. From Table 2, we also observed that the loop squareness ratio and the coercivity was decreased with increasing the platinum sublayer thickness for same nickel sublayer thicknesses. This is because of the fact that increasing $t_{Pt}$ for same $t_{Ni}$ decreases the Curie temperature and therefore the magnetization and loop squareness ratio.

It can be observed from Table 2 that a sample whose thickness of $t_{Pt}$ is above 4.6 Å is unsuitable for magneto-optical recording media because the loop squareness ratio is less than 1. The coercivity and magnetization can be tailored by varying the deposition conditions such as power applied to the target and sputter process pressure.

The transition between in-plane and perpendicular anisotropy is well understood to be due to the competing contributions from interface and volume to the magnetic anisotropy. Relatively thick films have in-plane magnetization due to the volume contribution is proportional to the square of the saturation magnetization, $M_S$.

The saturation magnetization values of Fe, Co and Ni are 1714, 1422, and 484 emu/cc, respectively. Since $M_S$ of Ni is lower than Fe and Co, the shape anisotropy contribution of Ni layer is roughly 9 times lower than Co, it is reasonable to expect perpendicular magnetic anisotropy at room temperature by optimizing the sublayer thickness. Also, due to the reduced volume contribution with respect to Co layer, a much larger range of magnetic layer thickness with perpendicular magnetic anisotropy is expected.

Since pure nickel films prepared by any of the deposition techniques show in-plane magnetization, and due to the fact that we observed perpendicular magnetic anisotropy with nickel layers separated by very thin Pt layers of thickness about 3 Å, we ascribe broken symmetry at interfaces to be major source of perpendicular magnetic anisotropy with contributions from magnetoelastic and magnetocrystalline anisotropies.

Figure 5:
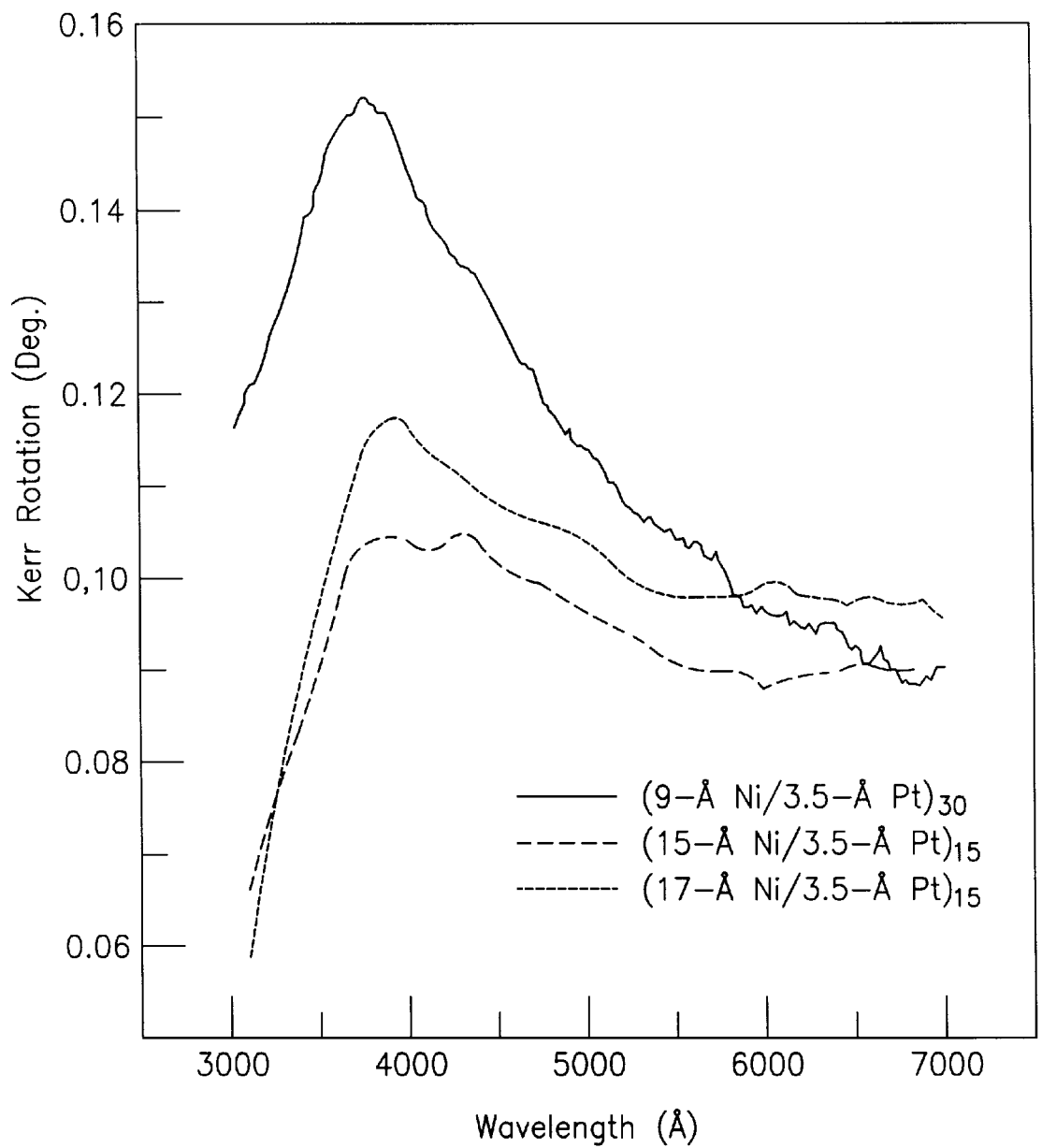
FIG. 5 shows typical Kerr spectra of Ni/Pt multilayers corresponding to (a) (9-Å Ni/3.5-Å Pt)$_{30}$, (15-Å Ni/3.5-Å Pt)$_{15}$, and (17-Å Ni/3.5-Å Pt)$_{15}$.

FIG. 5 illustrates the typical spectral dependence of Kerr rotation of Ni/Pt multilayers corresponding to (9-Å Ni/3.5-Å Pt)$_{30}$, (15-Å Ni/3.5-Å Pt)$_{15}$, and (17-Å Ni/3.5-Å Pt)$_{15}$. The Kerr spectra shows magneto-optic enhancement in the near UV region (lower wavelengths) similar to that observed in Co/Pt and Co/Pd multilayers.

The polar Kerr rotation is significant for application and also exhibits an increasing trend at lower wavelengths (7000–3500 Å). This property is suitable for magneto-optical applications, especially with the blue laser light. The enhanced Kerr spectra at low wave lengths can be ascribed to the polarization of Pt atoms arising from the interaction of nickel and platinum atoms. It can also be observed that Kerr rotation increases with increasing $t_{Ni}$ and that peak shifts to higher wavelengths.

However, in the spectral region, at wavelengths lower than the wavelength at which maximum occurs the Kerr rotation decreases with increase in $t_{Ni}$. The Kerr rotation can be further enhanced by using dielectric layer thin films of suitable thickness.

Although the invention has been described in considerable detail in the foregoing, such detail is solely for the purpose of illustration. Variations can be made in the invention by those skilled in the art without departing from the spirit and the scope of the invention except as set forth in the claims.

What is claimed is:

1. A magneto-optical recording media with multilayers of metal prepared
   by sequential deposition of Ni and Pt on a substrate with sublayer thickness $t_{Ni}$=9 to 21 Å and $t_{Pt} \leq 4$ Å and the number of repeats of the bilayer in the range 10–35.

2. A media of the claim 1, wherein the thickness of nickel sublayer is in the range of 9–11 Å and the thickness of the platinum sublayer is 2–4 Å and the number of repeats are in the range of 20–35.

3. A media of claim 1, wherein the thickness of nickel sublayer is in the range of 12–21 Å and the thickness of platinum sublayer is 2–4 Å and the number of repeats are in the range of 10–20.

4. A media of claim 1, wherein substrates of Ni/Pt multilayers is one of glass, PMMA (polymethylmethacrylate), PC(polycarbonate) or silicon for depositing by sputtering or evaporation techniques.

5. A media of claim 1, wherein the magneto-optical recording media has dielectric layer thin films in order to enhance the Kerr rotation in the Ni/Pt multilayers.

6. The media of claim 1, which exhibit perpendicular magnetic anisotropy at and above room temperature.

7. The media of claim 1, consisting essentially of said sublayers.

8. The media of claim 7, consisting of said sublayers.

9. The media of claim 1, having a loop squareness ratio of less than one.

10. The media of claim 6, having a loop squareness ratio of less than one.

11. The media of claim 1, prepared by ion sputtering technique.

12. The media of claim 6, prepared by ion sputtering technique.

* * * * *